Dec. 1, 1942.    H. A. PERSSON    2,303,705
HANDLE FOR FRAMES
Filed July 31, 1939    2 Sheets-Sheet 1

Inventor
H. A. Persson
By Lacey & Lacey
Attorneys

Dec. 1, 1942. H. A. PERSSON 2,303,705
HANDLE FOR FRAMES
Filed July 31, 1939 2 Sheets-Sheet 2
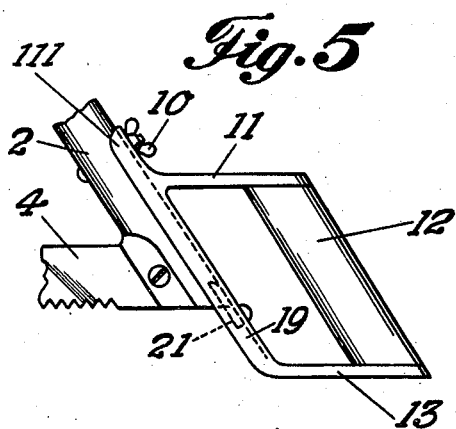
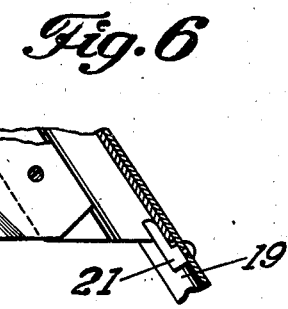
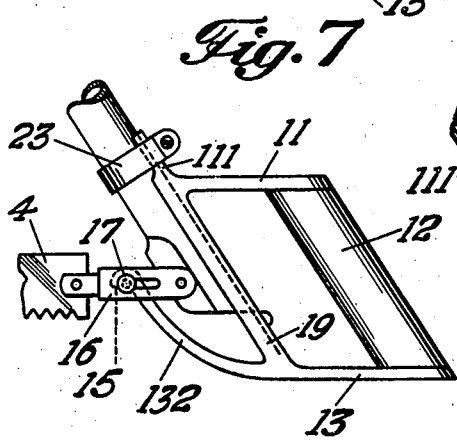
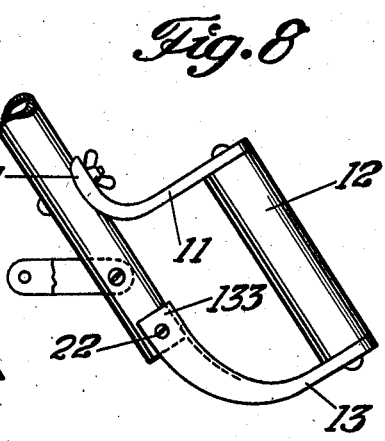
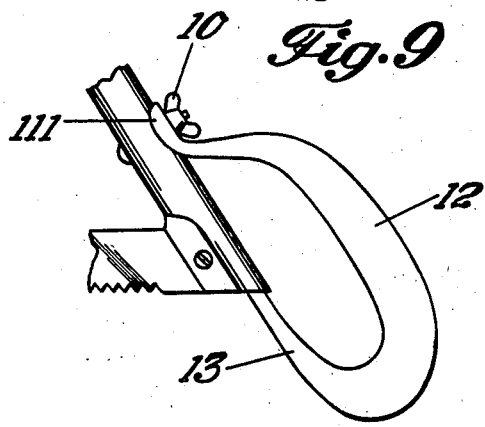
Inventor
H. A. Persson
By Lacey & Lacey
Attorneys Patented Dec. 1, 1942

2,303,705

UNITED STATES PATENT OFFICE 2,303,705

HANDLE FOR SAW FRAMES

Hermans Anders Persson, Edsbyn, Sweden, assignor of one-half to Jonas Leander Owen, Edsbyn, Sweden Application July 31, 1939, Serial No. 287,652
In Sweden August 23, 1938

1 Claim. (Cl. 145—108)

In saw frames of the kind hitherto known, which consist of a bent carrier frame or saw frame, between the ends of which a saw blade is intended to be inserted, the hand actuating the saw must grip the frame above the saw blade. By this, partly the length of the saw cut will be reduced, and partly the stroke of the saw blade will not be effected in a longitudinal direction, but in a more or less considerable angle to the longitudinal plane of the saw blade, whereby the sawing will be performed by jerks and will thus not be quite effective.

The present invention has for its object to avoid the aforesaid disadvantages by providing a saw frame with a fixed or detachable handle which is disposed outside the shank of the saw frame so that the total stroke of the saw blade may be utilised.

The handle according to the present invention is substantially characterised by the feature that it is firmly or detachably disposed outside the saw frame which preferably consists of a steel tube or the like, bent in U-shape, and that the same is connected with the saw frame by means of bolts, clamps or the like, disposed in one or more perforations in the saw frame, and that the handle is disposed upon one of the shanks of the saw frame in such a position in relation to a saw blade inserted in the saw frame, that the operating effort, exercised upon the handle, wholly or approximately is coincident with the longitudinal axis of the saw blade. Furthermore, the handle according to the invention is preferably further characterised by the fact that it has substantially a U-shape and that at least one shank is intended to be fixed to the shank of the saw frame under a certain degree of strain so that the handle in fact has a certain inherent springiness.

Further characteristics will be given in the following description with reference to the accompanying diagrammatic drawings, in which.

Figure 3:
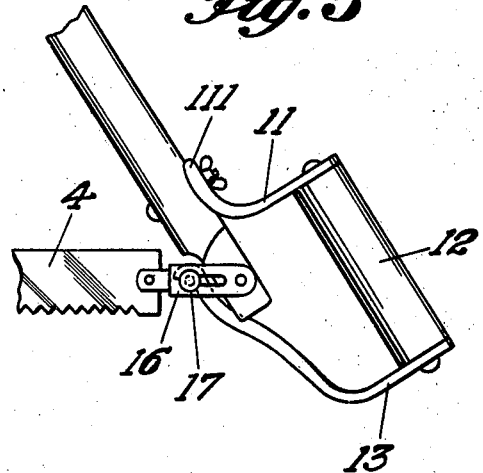
Figure 4:
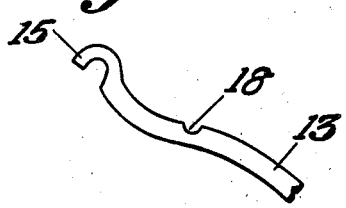

Figure 3 another modification of a handle according to the invention;

Figure 4 a detail of this latter modification in a larger scale;

Figure 5 a further modification;

Figure 6 a detail of this latter modification on a larger scale; and

Figures 7, 8 and 9 are three further modifications.

In the drawings, 1 denotes the saw frame, consisting for instance of a steel tube, bent in U-shape, between the shanks 2 and 3 of which the saw blade 4 is inserted in a manner known per se. In the form shown in Figure 1, the ends of the shanks are, on the innermost sides of the saw frame, split up, and the tube, the transverse section of which otherwise is circular is flattened out in such a way that on the inside of the saw frame near the ends of the shanks plain inwardly or outwardly turned resting surfaces 5 are formed, between which the saw blade may be inserted by means of bolts and nuts 6, and that on the outside of the shanks there are formed tubular formations 7 having substantially smaller sectional area than the saw frame tube 1 itself.

At a suitable height above the said flattened surfaces 5, the one shank 2 of the saw frame is provided with a perforation 8, which, for instance, is situated at a distance from the outer end of the shank 2 of about half the height of the handle (generally perhaps half a hand's breadth). Said perforation 8 is intended to receive a bolt 9 which, with its screw-threaded end projecting outwards from the saw frame and upon which a wing-nut or the like 10 can be screwed, is to receive the perforated lug 111 of the upper shank 11 associated with the handle 12. The shank 11 is suitably L-shaped, and the apertured lug portion 111, which is intended to rest upon the saw frame, is rounded so as to suit the external contour of the saw frame tube.

Figure 1:
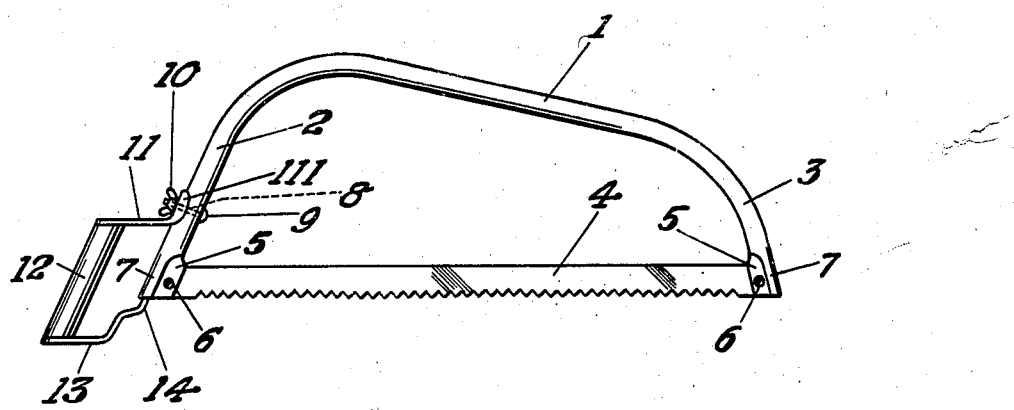
Figure 1 shows by way of example a saw frame with a handle according to the invention.
Figure 2:
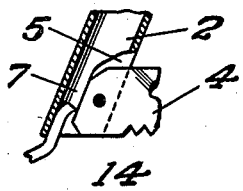
Figure 2 is a detail of the same on a larger scale.

The lower shank 13 of the handle is, according to the arrangement shown in Figure 1, bent to somewhat S-shape and is, at its end 14, intended to be engaged in the open tubular end 7 of the shank of the saw frame (see Figure 2), so that, after the said end 14 has been entered into the tube, the inner surface of the lug portion 111 is situated in some distance from the shank 2 and can not be engaged upon the bolt 9 and be brought to rest against the saw frame until forcibly manipulated against the action of the spring shank 13 of the handle, whereupon the wing-nut 10 can be screwed on the said bolt and tightened up. By means of this construction the handle is firmly fixed, but may, if needed, at any time be removed from the saw frame.

According to the modification shown in Figure 3, the inner end of the lower shank of the handle terminates in a hook-shaped portion 15. In the present case the saw blade 4 is attached to the saw frame by means of a link composed of a pair of spaced members 16 which may be articulatingly fixed by means of a bolt, rivet or the like, inserted in a perforation near the end of the shank of the saw frame. In a manner known per se in each of the mutually parallel shanks 16 of the link there is disposed a longitudinal notch, in which a bolt 17 or the like may be slided in longitudinal direction. The hook-shaped portion 15 of the shank 13 is disposed to be hooked on the bolt 17 extending between the spaced members 16 and there is consequently produced in the shank 13 an inherent tension, when the handle is preferably positioned, due to the fact that its middle portion is coming to rest against the outermost end of the shank of the saw frame. If needed, the shank 13 may be provided with a notch 18 so as to make the whole arrangement more secure.

According to the modification shown in the Figures 5 and 6, the handle has the following construction:

The lug portion of the shank 11 of the handle, which portion is intended to be engaged against the shank 2 of the saw frame, is provided with a somewhat channel-formed or shaped extension 19 below the end of the shank 2 of the saw frame. In order to obtain a firm engagement for the handle, there is disposed on the inside of the channel-formed extension 19 a springy hook-shaped member 21, into which the end 7 of the saw frame may be engaged (see Figure 6). The desired springiness in this construction is provided by the hook-shaped member 21 and, after having distorted the hook-shaped member 21 somewhat when inserting the handle, the bolt 9 may be introduced into the perforation and the wing-nut may be screwed on, whereupon the handle is secured to the saw frame firmly but is capable of springing somewhat in relation thereto on flexion of the hook-shaped member 21.

Figure 7 shows a modification of the handle rather like that shown with reference to Figures 5 and 6, except that the extended portion 132 of the shank is formed in a manner similar to that of the shank 13 of Figure 3, viz. it is provided with a hook-shaped member 15, which, as in the case of Figure 3, is disposed to engage the bolt 17 disposed between the spaced link 16. Also this modification is provided with a channel-formed extension 19 and a hook-shaped member 21 similar to the arrangement shown with reference to Figures 5 and 6.

In the modification shown with reference to Figure 8 the handle is provided with an upper shank 11, which in a manner described before, terminates in a lug 111 adapted to be secured to the shank 2 of the saw frame. The lower shank 13 of the handle is bent upwardly towards the end of the shank 2 of the saw frame and is tubular or semicircular, so that the tubular or semicircular portion wholly or partially may enfold the lower end of the shank of the saw frame. By means of a bolt 22 or the like, which passes through registering perforations disposed in the portion 133 and in the shank of the saw frame, the handle is sprung somewhat to provide a desired degree of springiness.

According to the modification shown in Figure 9, the handle consists of a member 12, substantially bent as shown, which member is intended to have its lower up-turned end or lower shank portion 13 inserted into the adjacent tubular end 2 of the saw frame with the handle under some degree of initial strain and the upper shank 111 secured to the saw frame above the saw blade. If necessary, the handle may be formed integrally with the saw frame, in which case the shank 2 is extended below the saw blade and bent upwards as shown and described, and finally is sprung to bring the lug 111 into contact with the saw frame end to be secured by the wing-nut 110.

In all modifications described above and shown in the drawings, the bolt 9 and the wing-nut 10 may be substituted by a clamp, (e. g. 23 of Figure 7) hook or the like for securing the handle to the saw frame. In order to obtain secure positionment of the said clamp, hook or the like 23 and of the lug member 111, the hook 21 or equivalent member may on its inside be provided with a pin, not shown in the drawings, which fits to a perforation provided to receive it in the shank of the saw frame. In the same manner a similar pin may be provided on the inside of the lug portion 111 to cooperate with an aperture or recess formed in the shank of the saw frame.

The invention is, of course, not limited to a saw frame of a bent steel tube, but may be utilised, with the modifications due to the material, on saw frames, which for instance consist of flat iron or the like of channel form, which may be in one piece or, in any manner known per se, consist of a number of parts with connecting means by which it is possible to adjust the distance between the ends of the shanks. Furthermore, the invention is not limited to the modifications described above and shown in the drawings, the details of which may, as will be understood from the description, be combined in the most various ways or be interchanged with equivalent parts and varied without limiting the scope of the invention.

I claim:

A saw including a frame having a tubular open end portion, a blade carried by the frame and having its rear end in said tubular end portion, and a handle extending rearwardly of the saw for manual engagement, said handle including a rigid upper shank connected with the tubular end portion of the frame and a semi-resilient lower shank connected with the lower end of the frame, said semi-resilient lower shank having an offset central portion and having a laterally bent free end portion, said laterally bent free end portion being clamped in the tubular end portion of the frame between the end of the blade and the inner surface of said lower end portion.

HERMANS ANDERS PERSSON.